United States Patent [19]

Fischer et al.

[11] Patent Number: 4,869,579
[45] Date of Patent: Sep. 26, 1989

[54] OPTICAL APPARATUS AND METHOD FOR BEAM COUPLING USEFUL IN LIGHT BEAM STEERING AND SPATIAL LIGHT MODULATION

[75] Inventors: Baruch Fischer, Haifa; Shmuel Sternklar, Technion City; Shimon Weiss, Givat Amos, all of Israel

[73] Assignee: Technion Research & Development Foundation, Haifa, Israel

[21] Appl. No.: 78,788

[22] Filed: Jul. 28, 1987

[30] Foreign Application Priority Data

Jul. 31, 1986 [IL] Israel ............................................ 79581
Mar. 1, 1987 [IL] Israel ............................................ 81723

[51] Int. Cl.[4] ............................ G02B 1/01; H01S 3/10
[52] U.S. Cl. ........................................ 350/354; 372/21
[58] Field of Search ................... 350/354, 355; 379/21, 379/97, 99

[56] References Cited

U.S. PATENT DOCUMENTS

| | | | |
|---|---|---|---|
| 4,233,571 | 11/1980 | Wang et al. | 331/94.5 C |
| 4,428,873 | 1/1984 | Murayama | 350/355 |
| 4,429,954 | 2/1984 | Caulfield et al. | 350/3.64 |
| 4,507,776 | 3/1985 | Smith | 350/354 |
| 4,508,431 | 4/1985 | Henshaw | 350/355 |
| 4,529,273 | 7/1985 | Gronin-Golomb et al. | 350/354 |
| 4,540,244 | 4/1985 | Sincerbox | 350/354 |
| 4,673,257 | 6/1987 | Rokni | 350/354 |
| 4,701,030 | 10/1987 | Jewell | 350/354 |

FOREIGN PATENT DOCUMENTS 2158602 11/1985 United Kingdom .

OTHER PUBLICATIONS

S. Odoulov, M. Soskin, and M. Vasnetsou, "Compensation for Tine Doderdent Phase Inhomogeneity Via Degererata Four-Wave Mixing in LitaO$_3$", *Optical Communications*, vol. 32, Number 2, pp. 355-358, Feb. 1980, Found.

Optics Letters, vol. 11, No. 8, Aug. 1986 SH, Sternklar et al., "Beam coupling and locking of lasers using photorefractive four-wave mixing" pp. 528-530.

Journal of the Optical Society of America B, vol. 3, No. 2, Feb. 1986 G. Pauliat et al. "Dynamic beam deflection using photo refractive gratings in Bi$_{12}$SiO$_{20}$ crystals" pp. 306-313.

*Primary Examiner*—Eugene R. Laroche
*Assistant Examiner*—Nathan W. McCutcheon
*Attorney, Agent, or Firm*—Ladas & Parry

[57] ABSTRACT

A novel optical system and method for coupling and mixing a plurality of beams which may originate from different optical sources and may be of different colors. There is provided deflection and steering of light beams with automatic (self-aligning) Bragg matching over a large beam deflection range which is not limited by the Brass condition. There is also provided a novel method of spatial light filtering and modulation, image color conversion, bidirectional beam interconnection for optical communication and combining and locking of laser sources.

13 Claims, 6 Drawing Sheets

FIG. 4A
FIG. 4B
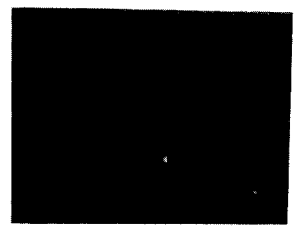
514.5 nm
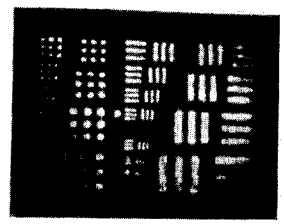
496.5 nm
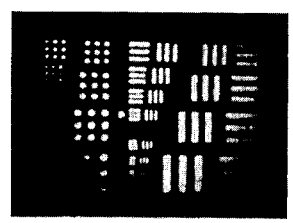
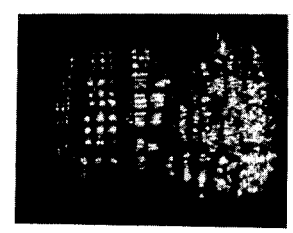
488 nm
476.5 nm
457.9 nm
FIG. 4C
FIG. 4D
FIG. 4E

OPTICAL APPARATUS AND METHOD FOR BEAM COUPLING USEFUL IN LIGHT BEAM STEERING AND SPATIAL LIGHT MODULATION

FIELD OF THE INVENTION

The present invention relates to certain optical devices and methods useful for coupling sources of light, more particularly, to optical devices for coupling and mixing laser beams originating from different laser sources, which is useful for steering light beams with automatic (self-aligning) Bragg matching, spatial light modulation, image color conversion, interconnection of light beams for optical communication, and for combining and locking different lasers together, based on multicolor pumped non-linear wave mixing oscillators.

BACKGROUND OF THE INVENTION

There are known optical devices and methods which provide optical wave mixing and oscillators in photorefractive media. Relevant patent documents and other publications include:

(1) U.S. Pat. No. 4,529,273 to Cronin-Golomb, et al. issued July 16, 1985;

(2) "Theory and Application of 4 Wave Mixing in Photorefractive Media", M. Cronin-Golomb, B. Fischer, J. O. White and A. Yariv, IEEE J. Quantum Electronics QE-20, 12 (1984);

(3) "Spatial Light Modulation and Filtering Effects in Photorefractive Wave Mixing", B. Fischer, S. Weiss and S. Sternklar, App. Phys. Lett. 50, accepted for publication, December 1986;

(4) "Beam Coupling and Locking of Lasers using Photorefractive 4 Wave Mixing", S. Sternklar, S. Weiss, M. Segev and B. Fischer, Opt. Lett. 11, 528 (1986), made the subject of commonly-owned Israel patent application No. 79581, filed July 31, 1986 and incorporated herein by reference;

(5) "Optical Apparatus and Method for Light Beam Steering and Spatial Modulation", B. Fischer and S. Sternklar, Israel patent application No. 81723, filed Mar. 1, 1987, commonly-owned by the owners of the present application, and incorporated herein by reference;

(6) "Double Phase Conjugate Mirror: Analysis, Demonstration and Applications", S. Weiss, S. Sternklar and B. Fischer, Opt. Lett. February 1987;

(7) "Electro-Optic and Acousto-Optic Scanning and Deflection", M. Gottlieb, C. L. M. Ireland and J. M. Ley, Optical Engineering, Vol. 3 (1983), Marcel Dekker, Inc. New York and Basel;

(8) "Opto-Optical Light Deflection", G. T. Sincerbox and G. Roosen, Appl. Optics 22, 690 (1983); and (9) "Dynamic Beam Deflection Using Photorefractive Gratings in BSO Crystals", G. Pauliat, J. P. Herriau, G. Roosen and J. P. Huignard, J. Opt. Soc. Am. B3, 306 (1986).

In addition, the technical literature, such as reference (1), has discussed the four-wave mixing process occurring in general photorefractive media, with particular reference to several types of phase conjugate mirrors. Various photorefractive oscillators were also described. Among them were various passive phase conjugate mirror (PPCM) arrangements.

The prior art relating to the operation of wave mixing oscillators also requires a single color beam from a single laser source common to all thhe mixing beams and also requoires external or internal (on the crystal surface) mirrors to create reflections for feedback to the photorefractive media. The use of a plurality of laser beam sources for coupling through the photorefractive media was considered impossible to achieve because of mutual coherency requirements. Also, prior art PPCM's were pumped by a single incident laser beam, as disclosed in background reference (1).

Most electronic and electro-optic techniques for light beam steering are based on the use of tunable volume gratings via acousto-optic or photorefractive effects, as disclosed respectively in references (7) and (8). These methods share the same basic limitation posed by the Bragg condition, namely, the existence of an upper limit on the deflecting range. Several techniques have been suggested to improve this limit, among these being the use of a pre-correction grating as discussed in reference (8).

There are many and varied laser applications which require phase locking of laser sources. The prior art teaches several methods for achieving this, such as injection locking for gas lasers and other external locking techniques, each of which requires careful optical alignment. In addition, these methods are adversely affected by aberrations in the laser cavity due to non-ideal optics or light guiding, thermal and other light path distortion effects which lower the overall coupling efficiency.

SUMMARY OF THE INVENTION

It is accordingly a principal object of the present invention to provide a novel optical system and method for coupling and mixing a plurality of beam which may originate from different optical sources and may be of different wavelengths (colors). Despite their difference in wavelength, these beams interact with each other, even in a slowly responding medium. The invention enables deflection and steering of light beams with automatic (self-aligning) Bragg matching over a large beam deflection range which is not limited by the Bragg condition. The invention also provides a novel method of spatial light filtering and modulation, image color conversion, bidirectional light beam interconnection and combining and locking of laser sources.

According to a preferred embodiment of the invention, there is provided a multi-color pumped wave mixer (MCPM) comprising at least two light beams originating from at least one light source and being incident as pumping beams on at least one side of a third order non-linear polarization medium, the at least two incident pumping beams having a predetermined alignment and spatial overlap in the interaction region of the medium whereat the incident pumping beams are coupled and self-diffracted, such that there emerges from the medium at least two output beams having controllable deflection angles and spatial and temporal modulation.

The present invention is useful in many types of applications, including, but not limited to, applications for laser beam scanning on a screen, laser printer apparatus, image processing techniques, bidirectional light beam modulation, bidirectional optical communication involving interconnection of matrix ports such as fiber arrays, and laser and beam combining.

In a preferred embodiment, the MCPM is configured such that each of the at least two pumpng beams is derived from a different laser source with a different wavelength (color) and the beams are directed to opposite sides of the medium, which is a photorefractive crystal. The previous designation of this configuration was that of a double color pumped wave mixing oscillator (DCPO), as described in background reference (5).

In another embodiment, one of the pumping beams or laser sources is wavelength tunable. This results in an angular offset between the output and input beams which depends on the wavelengths.

In another embodiment, one or more of the pumping beams is spatially or temporally modulated.

In yet another alternative embodiment, the optical system can be configured to provide clean-up of a distorted pumping beam and image color conversion.

In yet a further alternative embodiment, multiple pumping beams of different colors may be used.

In still another embodiment, it is possible to apply an electric field to the mixing medium to control output beam steering.

In yet another embodiment, the pumping beams are of the same wavelength. This results in the emergence from the medium in counterpropagating fashion the phase conjugate of each of the at least two pumping beams. This embodiment is referred to as the multi-pumped phase conjugate mirror (MPPCM).

If a predetermined power and frequency relationship exists between the two pumping beams which are derived from laser sources, the beam coupling may be manifested as laser locking. For example, a master laser providing a pumping beam on one side of the medium may cause phase locking of an array of slave lasers providing a plurality of pumping beams on the same or other side of the medium.

The various embodiments of the invention may also involve the use of single or multimode fibers. Distortion in the beam paths of the optical system is corrected in the MPPCM.

Other advantages and applications of the invention will become apparent from the drawings and the description contained hereinbelow.

BRIEF DESCRIPTION OF THE DRAWINGS

For a better understanding of the invention with regard to the embodiments thereof, reference is made to the accompanying drawings, in which:

FIGS. 4a–e show photographs of an experimental demonstration of the spatial light modulation and image color conversion of one of the output beams of FIG. 1;

DETAILED DESCRIPTION OF A PREFERRED EMBODIMENT

Figure 1:
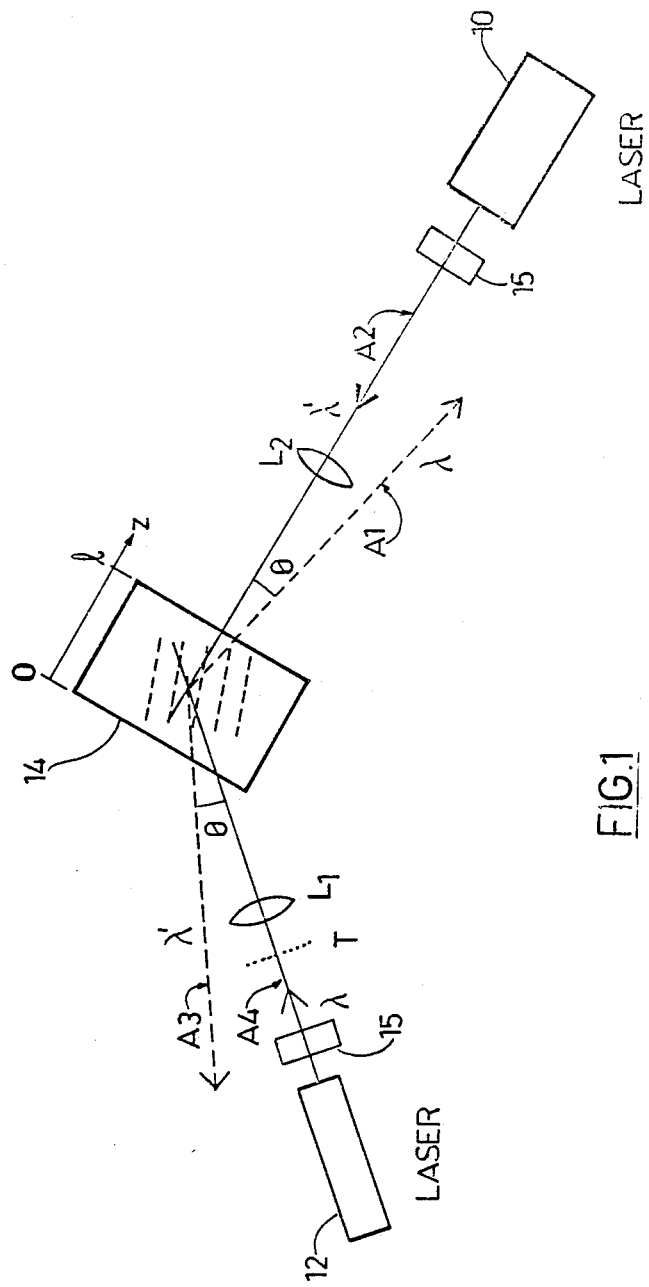
FIG. 1 is an illustration of beam steering in a multi-color pumped wave mixer arrangement using two incident pumping beams of different wavelengths (colors)

Turning now to FIG. 1, there is shown a preferred embodiment of a multi-color pumped wave mixer (MCPM). The basic configuration is the simultaneous input of two pumping beams, beams A2 and A4, from respective laser sources 10 and 12, which are directed through respective lenses L2 and L1 and are incident on a photorefractive medium 14. The two incident pumping beams A4 and A2 have respective wavelengths (colors) $\lambda$ and $\lambda'$, and photorefractive medium 14 can be any third order non-linear polarization medium, either an actual or effective third order non-linear polarization medium. A photorefractive crystal, such as barium titanate $BaTiO_3$ may be used.

There is no need for external feedback to the interaction region in this configuration, and the wavelengths $\lambda$ and $\lambda'$ may be arbitrary. These are important distinctions from the conclusions of the technical literature which indicates the need for the two input beams to have the same color and for external feedback to have an operative arrangement. Instead, in accordance with the invention, there is provided an alignment of the incident beams A2 and A4 such that there is a required spatial overlap and angular direction of these beams relative to each other and relative to the internal structure of the third order non-linear polarization medium 14.

This allows the four-wave mixing (4WM) process to occur in the interaction region of the medium 14 such that beams A3 and A1 are produced. In the case of photorefractive crystals such as $BaTiO_3$, the relationship of the beams to the internal structure is with respect to the c axis (not shown) of the photorefractive crystal. The angular configuration with respect to medium 14 must be within the range described in the literature as having an effect on the strength of the set of gratings which is built up in medium 14.

In the preferred embodiment, the two beam sources 10 and 12 are two different laser sources with wavelengths $\lambda'$ and $\lambda$ which may be tunable. A pair of control units 15, one in the path of each of laser beams A2 and A4, is provided for controlling polarization, wavelength tuning, degree of isolation and intensity. Beams A4 and A2 are guided into medium 14 through the use of respective lenses L1 and L2. The two beams enter medium 14, they build up a four-wave mixing process and this causes beams A1 and A3 to form as the outputs and these two ouputs emerge simultaneously.

Also, beams A4 and/or A2 can be spatially complex, that is, they can carry spatial information, such as would be provided if the beams have passed through an image-bearing transparency T or a distortion. This spatial information can be an intensity and/or phase modulation. Clearly, this includes the possibility of zero (DC) spacial light modulation. Beam A3 will have some spatial information of beam A4 and beam A1 will appear as carrying some spatial information of beam A2. However, the source of beam A1 is beam A4 and the source of beam A3 is beam A2. Thus, this configuration provides a new type of spatial light modulator or spatial filter with the possibility of image color conversion.

In addition, the intensity and/or phase of beams A4 and/or A2 can be temporally modulated. In this case, output beam A3, which is derived from the incident beam A2, will carry the temporal modulation of that beam. Similarly, output beam A1 will carry the temporal modulation of incident beam A4. As with the spatial light modulation, this clearly includes the possibility of zero (DC) temporal modulation. In this mode, the MCPM is an active bidirectional holographic optical communication link.

In accordance with the present invention, beam steering and photorefractive oscillation is obtained via the dynamic four wave mixing process which is induced and pumped by two input beams of different colors. Despite their differences in wavelength, these beams interact with each other to cause the self-generation of a common coherent grating and two oscillation beams of different colors. Efficient wave mixing occurs even in a slowly responding photorefractive crystal such as BaTiO$_3$ (used in our experiments) which has a time constant of about 1 second. Since this process is self-produced, it "finds" the solution with the highest gain, which corresponds to automatic Bragg matching. This results in an angular deflection of the output beams A3 and A1, which depends upon the wavelengths $\lambda$ and $\lambda'$.

The MCPM device of FIG. 1 has been referred to as a double color pumped wave mixing oscillator (DCPO) arrangement in Israel patent application No. 81723, filed Mar. 1, 1987, commonly-owned by the owners of the present application, and incorporated herein by reference. The DCPO arrangement, in turn, is an outgrowth of the double phase conjugate mirror (DPCM) which was described in commonly-owned Israel patent application No. 79581 as indicated in connection with background reference (4). In the DPCM arrangement, two input beams which may be mutually incoherent but of the same wavelength are simultaneously phase conjugated. In the MCPM device according to the present invention, this frequency degeneracy constraint is relaxed. Spatially modulated beams of different colors can exchange their spatial information through the wave mixing, resulting in image color conversion.

While not wishing to be bound by theory, it is believed that the advantageous results of the invention are obtained in accordance with the principles of the following discussion, which presents theory and demonstration of the image color conversion and beam steering.

In the preferred embodiment of the invention as shown in FIG. 1, the two pump beams A4 and A2, which have arbitrary wavelengths $\lambda$ and $\lambda'$, are the inputs into opposite sides of a photorefractive crystal, where they overlap. Even in a slowly responding photorefractive mixer such as BaTiO$_3$, the input beams interact with each other through a dynamic four-wave mixing process in which two other beams, A1 and A3, are self-generated. The two beams A1 and A3 have respective wavelengths $\lambda$ and $\lambda'$ and are accompanied by the buildup of gratings written by each pump beam together with its self-diffracted mate. That is, a common grating is simultaneously written by beam couples [A4, A1] and [A2, A3].

Figure 2:
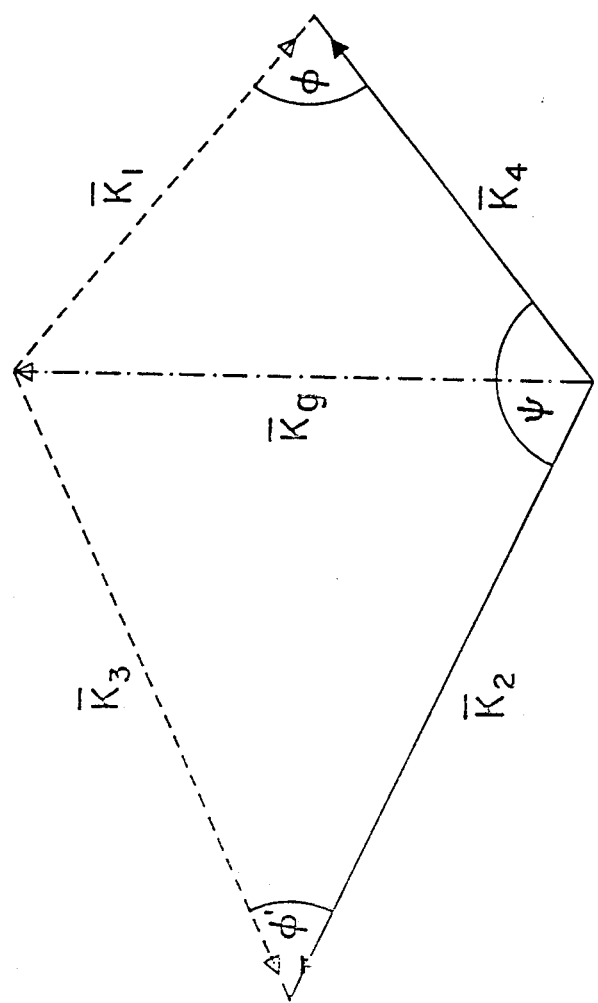
FIG. 2 shows a k vector diagram of the beams and gratings illustrated in FIG. 1.

In FIG. 2, the $\bar{k}$ vector diagram for the four wave mixing process of FIG. 1 is shown. The directions of the self-generated beams $\bar{k1}$ and $\bar{k3}$ an the direction and magnitude of the grating $k_g$ are self-chosen so as to fulfill the Bragg condition for both input colors simultaneously. This results in an angular offset $\theta$ (shown in FIG. 1) between the output and input beams for the non-degenerate input wavelengths. The MCPM relaxes the spectral constraints described in background reference (4) with regard to the double phase conjugate mirror (DPCM), which produces phase conjugate outputs in the frequency degenerate case.

The beam deflection capability of the MCPM is due to the dependence of $\theta$ on the wavelengths $\lambda$ and $\lambda'$. For increasing deviations of $\lambda'$ from $\lambda$, this deflection angle increases. Since this process is self-generated, it finds the most efficient angular configuration, that is, automatic Bragg matching occurs.

An analysis of this dependence can be made using FIG. 2, which describes the geometry of the beams inside the crystal. The input parameters are the wavevectors of the pumps $\bar{k4}$ and $\bar{k2}$ and the angle $\psi$ between them. In addition, we know the vector magnitudes $k1 = \bar{k4} = k = 2\pi/\lambda$ and $\bar{k3} = \bar{k2} = k' = 2\pi/\lambda'$. The direction of the wavevectors of the self-generated beams $\bar{k1}$ and $\bar{k3}$ are self-chosen through the oscillation such that a common grating is produced with $\bar{k}_g = \bar{k4} = \bar{k2} - \bar{k3}$. Thus, $$k_g = 2k \sin(\phi/2) = 2k' \sin(\phi'/2) \tag{1}$$

Furthermore, we see by inspection of the diagram that:

$$\phi + \phi' + 2\psi = 360° \tag{2}$$

This results in the following expression for the beam deflection $\theta$ inside the crystal:

$$\theta = (\phi - \phi')/2 = \tag{3}$$

$$\tan^{-1}\left[\frac{\sin \psi}{(\lambda'/\lambda) - \cos \psi}\right] - \tan^{-1}\left[\frac{\sin \psi}{(\lambda/\lambda') - \cos \psi}\right]$$

For small changes of $\lambda'$ around $\lambda$, this gives:

$$d\theta = -\sin \psi [d\lambda/\lambda] \tag{4}$$

In our experiments, the value of $\psi$ was chosen at $\psi \approx 173°$, hence $d\theta \approx 0.12(d\lambda/\lambda)$ in radians. Outside the crystal this angle is magnified due to refraction by a factor on the order of the crystal's refractive index ($\approx 2.4$). An increase of about one order of magnitude may be achieved for $\psi$ close to 90° (or large $k_g$).

An experimental demonstration of the beam deflection was carried out using two extraordinarily polarized input beams A4 and A2 to simultaneously pump a photorefractive BaTiO$_3$ crystal, as shown in FIG. 1. In this experiment, the c axis is parallel to the z axis. The input configuration was similar to that described in references (3), (4) and (6). Beam A4 was provided by the $\lambda = 488$ nm line of an argon ion laser 12 operating at all lines. Pump beam A2 was provided alternately by each of the laser's five strong lines (514.5 nm, 496.5 nm, 488 nm, 476.5 nm, and 457.9 nm) and the HeNe laser line (632.8 nm).

Figure 3:
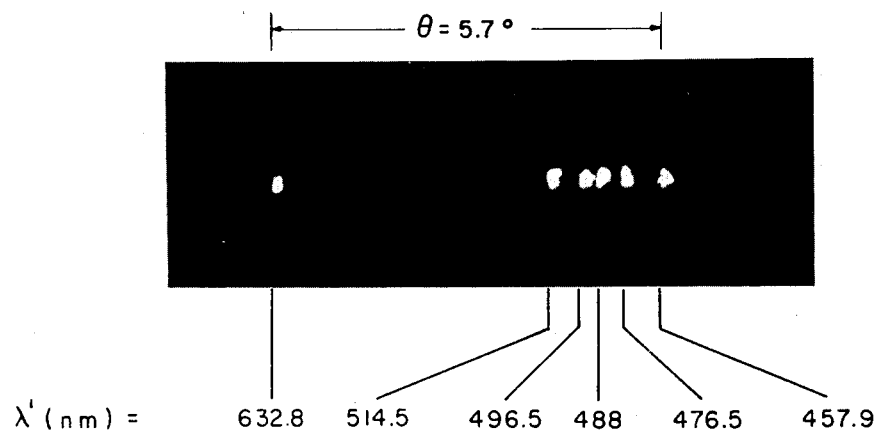
FIG. 3 shows a photograph of a deflected output beam obtained in an experimental demonstration of beam steering per the arrangement of FIG. 1.

The experiment showed that efficient wave mixing developed for each value of $\lambda'$. FIG. 3 shows the deflected output beam A1 and the corresponding $\theta$ values for each color (wavelength) of beam A2 with $\lambda = 488$ nm for beam A4. The deflection range in this experiment was about 5.7° for a $\lambda'$ tuning range of 174.9 nm. This value agrees with Eqs. (3) and (4) and can be significantly increased in a geometry where $\psi$ is close to 90°, and by using a wider range of $\lambda'$. High diffraction efficiencies for beam A1 were observed, varying from 30% to 60% for $\lambda'$ within the argon lines and about 6% for $\lambda' = 632.8$ nm. The coupling efficiency of the MCPM is a function of the intensity ratio of the input pump beams and parameters of the mixing medium 14.

An analysis of this device reveals that there are no basic restrictions on the range of $\lambda$ and $\lambda'$, as long as the photorefractive coupling constant is above some threshold value. In BaTiO$_3$, for example, the whole visible and near infrared spectrum should be appropriate. A continuous deflection can be achieved using a tunable laser, such as a dye or semiconductor laser. Practical devices would also apply fast switching times, better than that achieved with the BaTiO$_3$ crystal used in the experiments, which had a switching time in the range of between 0.1 and 1 second.

The operation of the MCPM improves when spatial information modulates one of the pump beams. This was done in our experiment with transparency T in the forms of a resolution chart disposed in the path of beam A4, as shown in FIG. 1. It helps force a collapse to an oscillation, by eliminating degrees of freedom for the generated beams A1 and A3, as described in reference (3). Removing this modulation can result in unwanted diffractions, especially out of the plane defined by the input pumps.

In conventional beam steering devices, little control can be exercised in modifying the beam's spatial profile. In some applications, it may be important to spatially modulate as well as to deflect a beam. The MCPM is unique in that it integrates these two characteristics while it automatically optimizes the efficiency, as explained earlier. Referring now to FIG. 1, output beam A3 at $\lambda'$, derived from pump A2, takes on the spatial information of pump A4 at $\lambda$ as it is deflected. Varying $\lambda$ in this case will change the deflection angle of this modulated output beam A3.

Unlike the double phase conjugate mirror (DPCM), the multi-color pumped wave mixer (MCPM) is not a phase conjugating device when $\lambda \neq \lambda'$, which is manifested in the angular offset of output beams A1 and A3 for non-degenerate frequencies. However, the detailed pictorial information carried on an input beam is still transferred to the "reflected" output, especially when only one input carries a picture.

As in holography, the pictorial input (on beam A4 in FIG. 1) is transferred to beam A3 (at a different color) with magnified or reduced scale. The transferred image quality in beam A3, for the case where $\lambda$ and $\lambda'$ are far apart, will also deteriorate. The need to simultaneously achieve Bragg matching of all of the spatial components of the grating puts an upper limit on the number of resolution elements that can be processed for $\lambda \neq \lambda'$.

Image transfer in the MPCM is closely related to the lack of image cross-talk in the DPCM which has been discussed elsewhere (background reference (3)). There, the oscillation build-up with phase conjugate outputs is due to the spatial overlap of gratings induced by the two beam couples [A1,A4] and [A2,A3] together with filtering effects of the volume gratings.

As stated earlier, spatially modulating the input pump beams improves the oscillation quality. It eliminates the conical diffraction in the direction perpendicular to the plane defined by inputs $\overline{k4}$ and $\overline{k2}$. This results from the reduction in degrees of freedom for the oscillation vectors $\overline{k1}$ and $\overline{k3}$, which must satisfy the grating's overlap and Bragg condition for every spatial frequency on the pumps. For the DCPO with different input wavelengths and angular detuning, this requirement seems to permit extensive spatial light modulation of one input pump beam. The use for real-time color conversion of images is clear.

The image color conversion was demonstrated experimentally in the configuration shown in FIG. 1. One of the pumps (beam A4 having wavelength $\lambda = 488$ nm) was spatially modulated by a resolution chart (transparency T) and then focused by lens L1 (f = 10 cm) into the crystal face z=0. Each of the 5 lines of argon laser 10 was alternately applied as beam A2, which was focused by lens L2 (f = 20 cm) through the crystal face z=1, and which crossed beam A4 in the crystal, with the same angular configuration used for each line. The angle between the beams A4 and A2 in the crystal was about 173° (as in the DPCM), and the crystal's midplane z=1/2 was approximately the common focal plane of both lenses L1 and L2. The image transferred from beam A4 to beam A3 with the color of pump beam A2, is shown in the series of photographs of FIG. 4.

Each photograph in FIG. 4 corresponds to a different wavelength of beam A2 (and A3), with constant $\lambda = 488$ nm for beam A4. The intensity of output beam A3 varied from 30% to 60% of the intensity of the input pump A2 over the whole spectral range used. When the HeNe laser was used for pump beam A2, reconstruction of small, select portions of the image were obtained on beam A3. In this case, the transmission efficiency of the MCPM was about 6%. Besides the decrease in resolution, another important factor is the difference in crystal efficiency for the two input wavelengths. This efficiency is a function of wavelength dependent material parameters and the input pumps' intensity ratio, as is shown below in connection with Eqns. (9) to (16).

The MCPM operated even when one or both input pumps consisted of the complete (unseparated) all-lines output of the argon laser. In particular, when input beam A4 contained all lines and was spatially modulated, inputting beam A2 at any wavelength $\lambda'$ within the argon spectrum resulted in efficient oscillations and a spatially modulated output beam A3. In this case, output beam A1 was seen to contain mainly the two strongest argon lines at 488 nm and 514.5 nm.

An analysis of the MCPM can be carried out in similar fashion as the DPCM, based on the non-depleted pumps approximation described in background reference (3). The coupled wave equations for the four mixing beams' amplitudes Ai (for beam i) are given by an extension of the degenerate frequency case (in the slowly varying wave approximation with transmission gratings per background reference (2)) as follows:

$$dA1/dz = \frac{-\gamma}{I_o}(A4\,A4^*)A1 - \frac{u\gamma}{I_o}(A2^*A4)A3 \quad (5)$$

$$dA3/dz = \frac{v\gamma}{I_o}(A2\,A4^*)A1 + \frac{(uv)\,\gamma}{I_o}(A2\,A2^*)A3 \quad (6)$$

where $$I_o = |A2|^2 + |A4|^2 \quad (7)$$

and the coupling constant for wavelength $\lambda$ and angle $\alpha$ between beam A1 and the crystal surface (z=0) normal is given by:

$$\gamma = \frac{i}{2}\,\frac{2\pi}{\lambda}\,\frac{n\,e^{-i\xi_I}}{\cos\alpha} \quad (8)$$

The coupling constant $\gamma$ incorporates an effective index refractivity $n_I$ which is a function of various material parameters as disclosed in background reference (2). $\xi_I$ is the phase shift between the index grating and the fringe pattern, and is equal to $\pi/2$ in crystals where diffusion dominates.

The difference in the grating writing (or refractivity) with wavelength λ' (beams A2 and A3) compared to λ (beams A4 and A1) is manifested in the second term of Eqns. (5) and (6), thrugh u, where $$u = \left[\frac{n_I(\lambda')}{n_I(\lambda)}\right]\left[\frac{\exp[-i\xi_I(\lambda')]}{\exp[-i\xi_I(\lambda)]}\right] \quad (9)$$

This difference is due to the different values of trap density and other material properties for different wavelengths.

The wavelength non-degeneracy in the gratings reading stage is expressed in the extra factor v in Eq. (6):

$$v = \left[\frac{\lambda}{\lambda'}\right]\left[\frac{\cos\alpha}{\cos\alpha'}\right] \quad (10)$$

where α' is the angle between beam A3 and the crystal's surface (z=l) normal (α and α' are not shown in FIG. 1).

The solution for A1 and A3 where the pumps A2 and A4 are taken to be constants (non-depleted) gives ρ and t; where $$\rho = A3(0)/A1(0) = \frac{-1}{u}\left|\frac{A4}{A2}\right|^* \frac{e^{\gamma l}-1}{e^{\gamma l}-q/(uv)} \quad (11)$$

and $$t = A1(l)/A1(0) = \frac{e^{\gamma l}[1-q/(uv)]}{e^{\gamma l}-q/(uv)} \quad (12)$$

The factors Ai(0) and Ai(l) are the amplitude values of beam A2 at z=0 and l respectively, and where the input pump's intensity ratio is given by:

$$q = |A4/A2|^2 \quad (13)$$

and p is given by:

$$p = (uv-q)/(1+q) \quad (14)$$

The operation points of the MCPM are at the infinities of ρ and t (i.e. oscillation), namely at conditions where:

$$\gamma l = (1/p)\ln[(q/uv)] \quad (15)$$

This gives the threshold value for γ l to be:

$$|(\gamma l)_{th}| = 1 + 1(uv) \text{ at } q=uv \quad (16)$$

Note that for the DPCM (the degenerate case) uv=1 and the correct values are obtained, i.e. $|(\gamma l)_{th}| = 2$ and q=1, as disclosed in background reference (3).

Applying an electric field to the crystal makes γ complex and changes the conditions for oscillation. This means that an electric field can change the operation and direction of the beam deflection.

These equations (11) to (16) show that there are no basic restrictions on the operation of the MCPM with any two input frequencies λ and λ'. The only requirement is that the corresponding value of |(γl)| not be less than the threshold value $|(\gamma l)_{th}|$ derived above in Eqn. (16). In BaTiO$_3$, the value of |(γl)| is sufficiently high throughout the visible spectrum including the near infra-red range. Thus, the MCPM using BaTiO$_3$ should be useful in this range. This enables, for example, image color conversions from the infra-red to the visible region.

Figure 5:
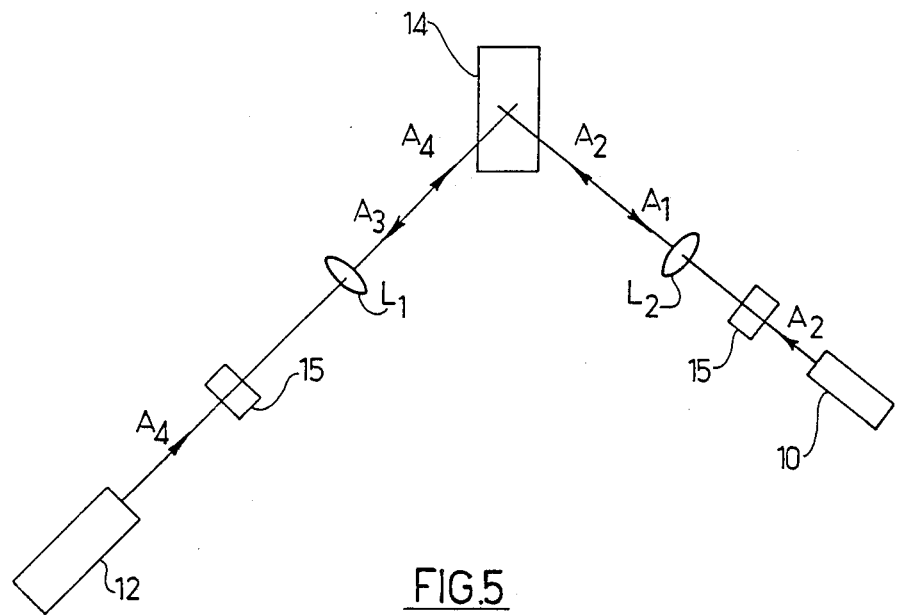
FIG. 5 is an illustration of a multi-pumped phase conjugate mirror (MPPCM) arrangement using two different laser sources.

Turning now to FIG. 5, there is shown a multi-pumped phase conjugate mirror (MPPCM) arrangement. The basic configuration is the simultaneous input of two beams of the same color (wavelength), beams A2 and A4 from respective laser sources 10 and 12 into a photorefractive medium 14, which can be any third order non-linear polarization medium, either an actual or effective third order non-linear polarization medium. A photorefractive crystal, such as barium titanate BaTiO$_3$ may be used. This arrangement allows the four-wave mixing (4WM) process to occur in the interaction region of the medium 14 such that phase conjugate beams A3 and A1 are produced.

As in FIG. 1, the two beam sources 10 and 12 are two different laser sources. A pair of control units 15, one in the path of each of laser beams A2 and A4, is provided for controlling polarization, degree of isolation intensity and amount of reflectivity. Beams A4 and A2 are guided into medium 14 through the use of respective lenses L1 and L2. The two beams enter medium 14, they build up a four-wave mixing process and this causes beams A1 and A3 to form as the outputs and these two outputs emerge simultaneously. Counterpropagating beam A3 is proportional to the phase conjugate of beam A4 and counterpropagating beam A1 is proportional to the phase conjugate of beam A2.

The addition of a beam splitter (not shown) makes it possible to derive the two incident beams A2 and A4 from either one of laser sources 10 or 12 with the operation of control unit 15 in the fully reflective mode for the other laser source.

Also, beams A4 and A2 can be spatially complex, that is they can carry spatial information, such as would be provided if the beams have passed through a transparency containing information in the form of images, etc. In that case beam A3 will appear as the phase conjugate of beam A4 carrying the full spatial information of beam A4 and beam A1 will appear as carrying the full spatial information of beam A2. However, the source of beam A1 is beam A4 and the source of beam A3 is beam A2. Thus, this configuration provides a new type of spatial light modulator or spatial filter.

In a successful experiment of this embodiment, source 10 was a Spectra Physics model 165 argon ion laser operating at its 488 nm line in multimode operation. Source 12 was a Spectra Physics model 171 argon ion laser operating at its 488 nm line in multimode operation. The medium 14 was a BaTiO$_3$ crystal with its c axis parallel to the z coordinate shown in FIG. 1. The beams A2 and A4 were extraordinarily polarized. The spatial overlap was about a 1 mm beam spot in medium 14.

Figure 6:
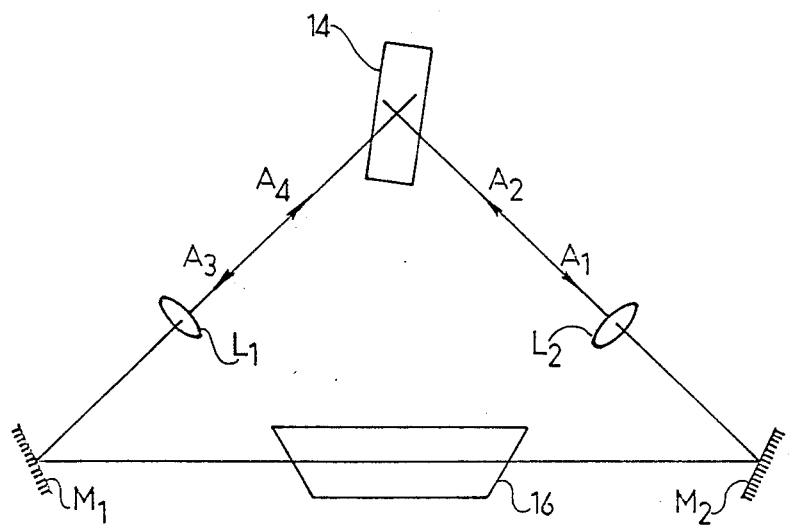
FIG. 6 shows a ring laser incorporating the MPPCM arrangement.

Referring now to FIG. 6, there is shown a ring laser incorporating the MPPCM arrangement. This configuration provides medium 14 with feedback through an external ring cavity employing mirrors M1 and M2 on either side of a gain medium 16, where mirror M1 is partially transmissive. As in FIG. 1, this configuration provides a pair of counterpropagating phase conjugate beams A3 and A1 which allows operation in the presence of distortions in the ring cavity and single and multimode fibers. This configuration has applications as a laser with a ring cavity, for example as a ring laser gyroscope, where the output from mirror M1 provides an indication of rotation using laser gyroscope techniques.

Figure 7:
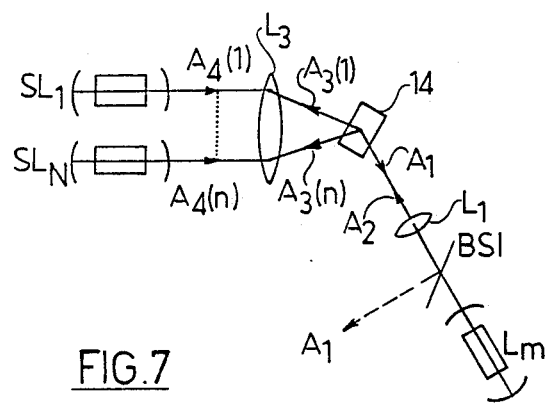
FIG. 7 shows a beam combining or laser locking system using the MPPCM arrangement.

Referring now to FIG. 7, there is shown a beam combining, beam interconnection, or laser locking system using the MPPCM arrangement of the present invention. Used as a beam combiner, the system is configured such that there is a single incident beam A2 impinging on medium 14 on one side and a set of one or more lasers SL1 . . . SLn respective providing beams A4(1) . . . A4(n) incident on medium 14 on the other side. The set of lasers, which can also be a laser array, are combined together through the four-wave mixing process to form one output beam A1 and beams A3(1) . . . A3(n) counterpropagating with respect to beams A4(1) . . . A4(n). Beam A1 is reflected as an output beam by beam splitter BS1.

Used as a light beam interconnection system, the intensity and/or phase modulation on pumping beam A4 is transferred to the output beam A1. Similarly, the intensity and/or phase modulation on pumping beam A2 is transferred to output beam A3. In FIG. 7, beams A4 and A1 actually represent an array of input beams which may be delivered to medium 14 via optical fibers.

Used as a laser locking system, the configuration of FIG. 7 shows a single laser source having a steady output being used as a master laser Lm providing an incident beam A2 which passes through the beam splitter BS1 onto one side of medium 14. On the other side of medium 14 there is directed an array of slave inputs SL1 . . . SLn, either laser sources or laser gain media or combination thereof. The cavity mirrors of some or all of the laser sources may be fully or partially reflective. Under predetermined power and frequency conditions with respect to the operation of each of the multiple slave lasers or laser gain media, coupling of the slave laser beams will occur and slave laser sources SL1 . . . SLn will be locked in phase with each other and with master laster source Lm, again providing an output beam A1 which is reflected by beam splitter BS1.

The above-referenced power and frequency conditions to achieve laser locking in a four-wave mixing process are well known and described in the literature, especially as regards diode lasers and gas lasers. Examples of this can be found in papers by M. B. Spencer and W. E. Lamb, Phys. Rev. A 5, 893 (1972), and G. R. Headley, J. Quantum Electron, QE-22, 419 (1986) and references cited therein.

The master laser source Lm may be replaced by a laser gain media, with laser locking of the slave lasers as before. Also, in FIG. 7, the arms of the optical system between the slave inputs and medium 14 can contain distortions or a single or multimode fiber and the system will still operate due to the phase conjugate nature of all the counterpropagating beams pairs.

Lens $L_3$ acts to focus individual slave lasers SL1 . . . SLn into medium 14, and can be provided either as a single lens for all the individual laser sources or as a plurality of individual lenses each one corresponding to an individual laser source.

The optical system of FIG. 7 can also be used for beam clean-up applications. Where one or more of the inputs on one side of the medium contain spatial phase aberrations, the phase conjugating ability of the MPPCM arrangement allows for these beam aberrations to be cleaned up. This is accomplished by introducing unaberrated beam A2 as the input to the other side of medium 14 so that its phase conjugate emerges as beam A1 with aberration-free wavefronts and is reflected by beam splitter BS1.

Figure 8:
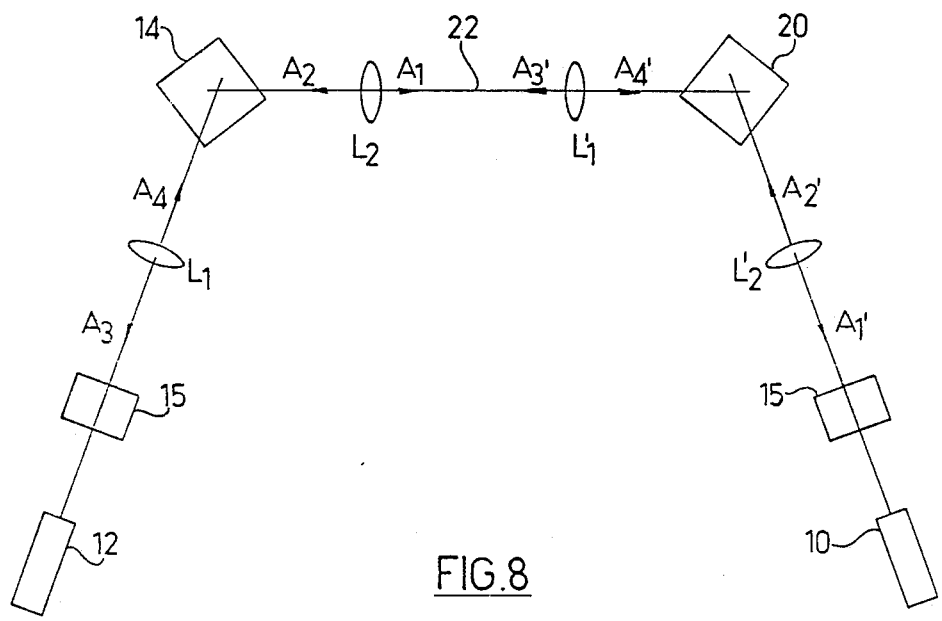
FIG. 8 shows a beam resonator employing two MPPCM arrangements.

Turning to FIG. 8, there is shown a beam resonator arrangement. In this configuration, there are two facing mediums 14 and 20 each being employed in a multi-pumped phase conjugate mirror arrangement, with feedback between them through the arm 22 of the system. The input to one side of one medium is the output of one side of the other medium, and vice versa. In this configuration, the counterpropagating beams A1, A2 and A3', A4' between mediums 14 and 20 are respective phase conjugate pairs such that A2 is the phase conjugate of A1, and similarly A3' is the phase conjugate of A4'. Also, the relationship of the remaining beams is similar such that A3 is the phase conjugate of A4 and A1' is the phase conjugate of A2'. It is noted that A4' is actually the continuation of A1 and A2 is the continuation of A3'.

In operation, the input to this configuration is from individual laser sources 10 and 12 which respectively provide incident beams A2' and A4. The control units 15 are operated in the fully transmissive mode. Incident beams A2' and A4 may be spatially complex. There are built up iteratively in arm 22 between mediums 14 and 20 beams A1 and its phase conjugate pair A2 along with beams A4' and its phase conjugate pair A3', each of which may be spatially modulated.

In another application of this configuration, either of control units 15 may be operated in the fully reflective mode, so that only one of the laser sources 10 or 12 is actually used.

With reference to FIG. 8, there may be an element which provides spatial modulation in arm 22 between the two mediums 14 and 20, such as a hologram. This will modulate the spatial beam structure of the counterpropagating beams. As an example, a particular arrangement would be the provision of an optical implementation of iterative problem-solving algorithms or a associative memory.

Thus, it is seen that in accordance with the principles of the present invention, there is provided a multi-color pumped mixer arrangement useful for many and varied applications where beam combining, beam steering, spatial modulation and image color conversion of beam sources is required.

For the special case where all of the pumping beams are of the same color, but may be derived from different sources, there is provided a multi-pumped phase conjugate mirror (MPPCM) arrangement useful for many and varied applications where beam combining, laser locking, spatial modulation and phase conjugation of beam sources is required.

While the principles of the invention have been described with regard to specific embodiments, it is to be understood that the description is made by way of example only and not as a limitation on the scope of the invention, which is set forth in the appended claims.

We claim:

1. A multi-color pumped wave mixer (MCPM) comprising:
    at least two pumping beams that differ in at least one of the phase and frequency, and originate from at least one light source and being incident on at least one side of a third order non-linear polarization medium, said at least two incident pumping beams having a predetermined alignment and spatial overlap in the interaction region of said medium whereat said incident pumping beams are coupled and self-diffracted, each of said at least two incident pumping beams generating a self-diffracted mate and defining together therewith a beam couple, the beam couples produced from the at least two incident pumping beams being operative to write a common grating in the third order non-linear polarization medium, such that there emerge from said medium at least two output beams having controllable deflection angles and spatial and temporal modulation.

2. The MCPM of claim 1 wherein said at least two light beams have the same color to provide a multi-pumped phase conjugate mirror (MPPCM) arrangement such that each of said output beams emerges in counterpropagating fashion as the phase conjugate of the respective one of each of the at least two incident pumping beams.

3. The MCPM of claim 1 wherein at least one of said incident pumping beams is wavelength tunable.

4. The MCPM of claim 1 wherein beam steering is provided by tuning the wavelength of at least one of said incident pumping beams to change the output angle at which at least one of said output beams emerges from said medium.

5. The MCPM of claim 1 wherein at least one of said at least two pumping beams has at least two different colors.

6. The MCPM of claim 1 wherein at least one of said incident pumping beams carries spatial and temporal light modulation such that at least one of said output beams carries at least a portion of said spatial and temporal light modulation.

7. The MCPM of claim 6 wherein said at least two incident pumping beams have different colors such that there is provided color conversion of said spatial light modulation carried by at least one of said at least two incident pumping beams and such that at least a portion of said spatial light modulation emerges on at least one of said output beams with a different color than that of said at least one of said at least two incident pumping beams.

8. The MCPM of claim 1 and also comprising means for applying an electric field to said medium for beam steering of at least one of said output beams.

9. The MCPM of claim 1 and further comprising a control unit disposed in the path of either of said incident pumping beams, wherein said control unit controls at least one of the intensity, polarization, wavelength and degree of isolation of said incident pumping beam.

10. The MPPCM of claim 2 wherein at least one of said incident pumping beams is provided on one side of said medium for coupling into at least one other of said incident pumping beams on the other side of said medium.

11. The MPPCM of claim 10 wherein a first plurality of incident pumping beams is provided on said one side of said medium and a second plurality of pumping beams is provided on said other side of said medium, said first and second plurality of beams having a predetermined power and frequency relationship between them such that there occurs locking of all of said laser sources.

12. A method of providing output beams having controllable deflection and being derived from each of at least two pumping beams originating from at least one source, said method comprising the steps of:

directing at least two pumping beams that differ in at least one of phase and frequency and originate from at least one light source to be incident upon at least one side of a third order non-linear polarization medium, and providing said at least two incident pumping beams with a predetermined alignment and spatial overlap in the interaction region of said third order non-linear polarization medium whereat said incident pumping beams are coupled and self-diffracted, each of said at least two incident pumping beams generating a self-diffracted mate and defining together therewith a beam couple, the beam couples produced from said at least two incident pumping beams being operative to write a common grating in said third order non-linear polarization medium such that there emerges from said third order non-linear polarization medium at least two output beams having controllable deflection angles and spatial and temporal light modulation.

13. The method of claim 12 wherein at least two of said incident pumping beams having the same color such that there emerges from said medium in counterpropagating fashion the phase conjugate of each of the at least two incident pumping beams.

* * * * *